US007268918B2

(12) United States Patent
Postle et al.

(10) Patent No.: US 7,268,918 B2
(45) Date of Patent: Sep. 11, 2007

(54) SYSTEM AND METHOD FOR CONTROLLING METAMERISM

(75) Inventors: Stephen R. Postle, Glen Rock, NJ (US); Danny C. Rich, Hamilton Township, NJ (US); Lowell D. Wilson, Cincinnati, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 114 days.

(21) Appl. No.: 10/709,827

(22) Filed: Jun. 1, 2004

(65) Prior Publication Data

US 2006/0012810 A1   Jan. 19, 2006

Related U.S. Application Data

(63) Continuation of application No. 09/931,678, filed on Aug. 16, 2001, now Pat. No. 7,034,960.

(51) Int. Cl.
*G06F 15/00* (2006.01)
*G06K 9/00* (2006.01)

(52) U.S. Cl. .................. 358/1.9; 358/504; 358/518; 358/1.15; 382/162; 382/167

(58) Field of Classification Search ............. 358/1.9, 358/1.1, 1.6, 1.13, 504, 518, 1.15; 399/54; 345/593–595, 700, 733, 737, 740, 748; 356/402; 382/162, 167
See application file for complete search history.

(56) References Cited

U.S. PATENT DOCUMENTS

| 4,649,502 A | 3/1987 | Keller et al. ............. 364/519 |
| 4,813,000 A | 3/1989 | Wyman et al. ............ 364/526 |
| 4,843,574 A | 6/1989 | Gerber ...................... 364/526 |
| 5,141,323 A | 8/1992 | Kipphan et al. ........... 356/406 |
| 5,182,721 A | 1/1993 | Kipphan et al. ........... 364/526 |
| 5,195,043 A | 3/1993 | Varner ...................... 364/410 |

(Continued)

FOREIGN PATENT DOCUMENTS

DE   3707027   9/1988

(Continued)

OTHER PUBLICATIONS

Crim, Elias, Controlling Digital Color, American Printer, Nov. 1997, pp. 26,28, and 30.

(Continued)

*Primary Examiner*—Kimberly Williams
*Assistant Examiner*—Charlotte M. Baker
(74) *Attorney, Agent, or Firm*—Kramer Levin Naftalis & Frankel LLP

(57) ABSTRACT

The present invention provides a plurality of representations of color that are stored in an electronic color library and that can be selected by a user. After a color selection is made, a plurality of color ink formulas and/or colorant formulas capable of producing the selected color are provided. Further, other selections can be made to define a substrate or other criteria that can impact the color ink formulas. A plurality of color ink and/or colorant formulas are provided and optimized in order to reduce or eliminate undesired effects caused by metamerism. The formulas can be transmitted over a communication network, such as the Internet or a local Intranet to another party, such as color products manufacturers.

20 Claims, 7 Drawing Sheets

U.S. PATENT DOCUMENTS

| | | | | |
|---|---|---|---|---|
| 5,400,138 | A | 3/1995 | Peterson et al. | 356/319 |
| 5,406,475 | A | 4/1995 | Kouchi et al. | 364/401 |
| 5,450,314 | A | 9/1995 | Kagami et al. | 364/148 |
| 5,555,505 | A | 9/1996 | Oosawa et al. | 364/470.07 |
| 5,668,633 | A | 9/1997 | Cheetam et al. | 356/402 |
| 5,680,327 | A | 10/1997 | Cook et al. | 364/526 |
| 5,720,017 | A | 2/1998 | Cheetam et al. | 395/131 |
| 5,774,230 | A | 6/1998 | Goto | 358/298 |
| 5,841,421 | A | 11/1998 | Cheetam et al. | 345/150 |
| 5,877,966 | A | 3/1999 | Morris et al. | 364/512 |
| 6,015,809 | A | 1/2000 | Zhu et al. | 514/210 |
| 6,040,902 | A | 3/2000 | Jung et al. | 356/73 |
| 6,043,894 | A | 3/2000 | Van Aken et al. | 356/425 |
| 6,108,095 | A | 8/2000 | Graf | 356/425 |
| 6,192,147 | B1 | 2/2001 | Bucher et al. | 382/165 |
| 6,233,496 | B1 | 5/2001 | Ippitsu | 700/133 |
| 6,342,952 | B1 * | 1/2002 | Chan | 358/1.9 |
| 7,053,910 | B2 * | 5/2006 | Newman | 345/604 |
| 2004/0073526 | A1 * | 4/2004 | McClanahan | 706/15 |

FOREIGN PATENT DOCUMENTS

| | | |
|---|---|---|
| DE | 3714179 | 11/1988 |
| DE | 4229267 | 3/1994 |
| DE | 4237004 | 5/1994 |
| DE | 19637234 | 3/1998 |
| EP | 0 825 506 A2 | 2/1998 |
| GB | 2071473 | 9/1981 |
| GB | 2107047 | 4/1983 |
| GB | 2289018 | 11/1995 |

OTHER PUBLICATIONS

Stoy, John W., Palette Control Made Easy, Electronic Publishing, May 1997, pp. 46-47.

Lovig-Neale, Deb, Digitial Color Fidelity in the 1990S: Attacking Color Shifts, Electronic Publishing, Aug. 1994, pp. 14-16, and 18.

Matching System Ensures Accuracy, Printing Impressions, Oct. 1990, pp. 36H-36K.

Bonham, J.S., Flowers, A.G., Johnson, L.B., On-Line Color Control for Mechanical Papers, Pulp & Paper Canada, Apr. 1990, pp. 43-46.

Kaverman, John, Color Matching for Pad Printing, Screen Print, Dec. 1999m pp. 38-40, 42,44, and 46.

Brigss, John C., Forrest, David J., Tse, Ming-kai, Reliability Issues for Color Measurement in Quality Control Applications, NIP 14:International Conference on Digital Printing Technologies, Toronto, CA, Oct. 1998, pp. 595-602.

Prolink Color Guard Color-Matching Software, Screen Printing, Nov. 1995, pp. 132.

1995 TAPPI Conference- Dyes, Fillers & Pigments Short Course, Chicago, IL, Apr. 26-28, 1995, pp. 401-418.

Sule, A D. Recent Developments in Colour Measurement and Colour Management, Indian Journal of Fibre & Textile Research, vol. 21, Mar. 1996, pp. 64-68.

Holland, Caryl, Color Impact & Control, American Ink Maker, Sep. 2000, pp. 14-17.

Rosen, Mitchell, Fairchild, Mark D., Johnson, Garrett M., Wyble, David R., Color Management Within a Spectral Image Visualization Tool, Munsell Color Science Laboratory, Rochester Institute of Technology Rochester, NY.

Mijdam, Edward, Computer-Controlled Color Matching of Flexographic Inks in a Production Printing Environment, American Ink Maker, Aug. 2001, pp. 44-49.

Tolliber-Nigro, Heidi, The Packaging Workflow: What's Really Going on in There?, American Ink Maker, Jun. 2001, pp. 30, 32, 36, 37, 59, and 60.

Taskar, Milind: Kannan, R., Colour Maker-An Infinite Shade Card and the Colour Trend Setter of Shades in the Industry, Pigment and Resin Technology, vol. 27, pp. 9-11.

Datacolor Press Release, Lawrenceville, NJ, Jul. 11, PRNewsire.

* cited by examiner

SYSTEM AND METHOD FOR CONTROLLING METAMERISM

CROSS REFERENCE TO RELATED APPLICATIONS

This application is a Continuation-In-Part of U.S. application Ser. No. 09/931,678, filed Aug. 16, 2001 now U.S. Pat. No. 7,034,960, entitled System and Method for Managing Electronic Transmission of Color Data, of which the entire disclosure is incorporated herein by reference.

BACKGROUND OF INVENTION

Electronic color production hardware and software systems currently exist which separately and independently perform tasks associated with production of color-related products. For example, a known system reads a visible spectrum of a color sample and generates data regarding measured amounts of light absorbed or reflected at particular points in the spectrum. Any given color has a spectral curve associated with it that functions as a signature of the color. Once a spectral curve is determined, the visible spectrum and coefficients are then processed to predict a color formula for reproducing the color. The color formula can then be analyzed, for example, to create a color ink formula for creating a colored object.

Other common color representations exist, for example RGB represents the degree of red, green and blue in a color. CMYK represents the degree of cyan, magenta, yellow and black in a given color Accurate translation between color representations, for example a translation from RGB to CMYK for computer monitors and computer printers is provided by various software applications. Accurate color reproduction is achieved, in part, by retrieving data for a plurality of input and output devices, e.g., printers, monitors, and color measuring devices, and modifying the color translation formulas to account for the specific devices receiving the data. Computer software design packages, such as ADOBE ILLUSTRATOR and PAGEMAKER, provide such conversion functionality. Another known system provides a method and apparatus for accurately matching colors. For example, spectral data are received from a color measuring device and the corresponding color is matched in an electronic color library. The desired color is compared to colors stored in the electronic color library and the color or colors in the library that are within a specified color range are reported. By searching in an electronic library, the traditional standard color swatch book used for locating a desired color is replaced. This electronic color library is vulnerable, however, to problems associated with reproducing samples from multiple devices.

Another method involves receiving a communication of the designer's computer image and converting the RGB setting to CIELAB values. Computer software design packages such as ADOBE PHOTOSHOP provide such conversion functionality.

Methods exist for defining color ink formulas for making ink suitable for creating a particular color on two or more particular substrates or materials. For example, an ink formula is known to produce a particular shade of blue on corrugated cardboard. A different ink formula is known to produce the same shade of blue on aluminum. Problems are known to occur, however, with respect to metamerism. In such a case, while the two shades of blue in the above example appear identical in one lighting environment, the shades appear different in a second lighting environment. Problems associated with metamerism are known to increase with respect to specific colors, such as light purples, grays, tans, browns and blues. Moreover, the types of inks used to manufacture products can impact the degree of metamerism. For example, when the color of the label is required to match the pigmented plastic of a container, pigmented inks tend to minimize the changes in appearance caused by metamerism, while dye based inks will appear differently under differing lighting conditions. Inks, normally printed over a white or metallic substrate as a transparent film, will exhibit some metamerism compared to the identical pigment mixed with a white pigment, such as is the common practice in structural plastics or opaque paint films.

Another example of a problem associated with metamerism is caused by different dye lots used to create a colored product. For example, a strip of cloth that contains dye from two different dye lots may appear the same under specific lighting conditions, and different in other lighting conditions. The respective dye lots can reflect and absorb different light wavelengths somewhat differently, thereby causing the appearance of cloth to vary under different lighting conditions. See, for example, *Metamerism and Metameric Pairs*, M. David Stone, Jun. 9, 2001 (published to www.extremetech.com).

In commercial settings, undesirable effects caused by metamerism can be expensive and significant. Products may have to be remade or modified due to undesired appearances caused by metamerism in order to comply with customer demands. The ramifications of customer dissatisfaction caused by metamerism can result in high financial costs. Commercial vendors of computer color matching software, such as Datacolor International, GretagMacbeth, or X-Rite, all offer some form of color and formula storage and retrieval processes, often termed a palette. But these options are available for only a single product application (a single ink palette, a single plastics palette or a single textile palette). Using the separate palettes requires optimizing to an external standard. Two optimized matches to an external standard may not exhibit the optimum match to each other, leaving the final product with an objectionable color mismatch.

SUMMARY OF INVENTION

The foregoing illustrates the need for a system and method that provides a solution to problems associated with metamerism. In a preferred embodiment, a designer or specifier of materials uses an electronic color library to select a color which can be applied to a range of material types. In a preferred embodiment, two or more material types are identified by the designer or specifier that are to have the selected color applied thereto, typically with respect to a single manufacturing application. For example a paper label on a plastic bottle is to be colored a particular shade of blue, while a plastic bottle cap for a bottle is to be colored the same shade of blue. In accordance with the present invention, a designer or materials specifier uses the present invention to provide a first colorant formula for the ink to be printed on the paper label, and a second colorant formula for the plastic bottle cap. The present invention preferably electronically optimizes the first formula and the second formula in order to minimize and control metamerism between the paper label and the plastic bottle cap. More particularly, the present invention provides a system and method for electronically providing a plurality of formulas that are suitable to produce a color for at least two colored products, providing electronic color choices that are selectable to represent the color, and for providing electronic criteria choices that are selectable to represent at least a characteristic of colored products. Moreover, the present invention receives an electronic color selection, receives a first electronic criteria selection receives a second electronic criteria selection and electronically matches the electronic color selection and the first electronic criteria selection to provide a first formula that is suitable to produce the color represented by the electronic color selection for a first of the at least two colored products and electronically matches the electronic color selection and the second electronic criteria selection in order to provide a second formula suitable to produce the color for a second of the at least two colored products. Moreover, the present invention electronically optimizes the first formula and the second formula to control metamerism between the first colored product and the second colored product.

BRIEF DESCRIPTION OF DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF THE INVENTION

Figure 1:
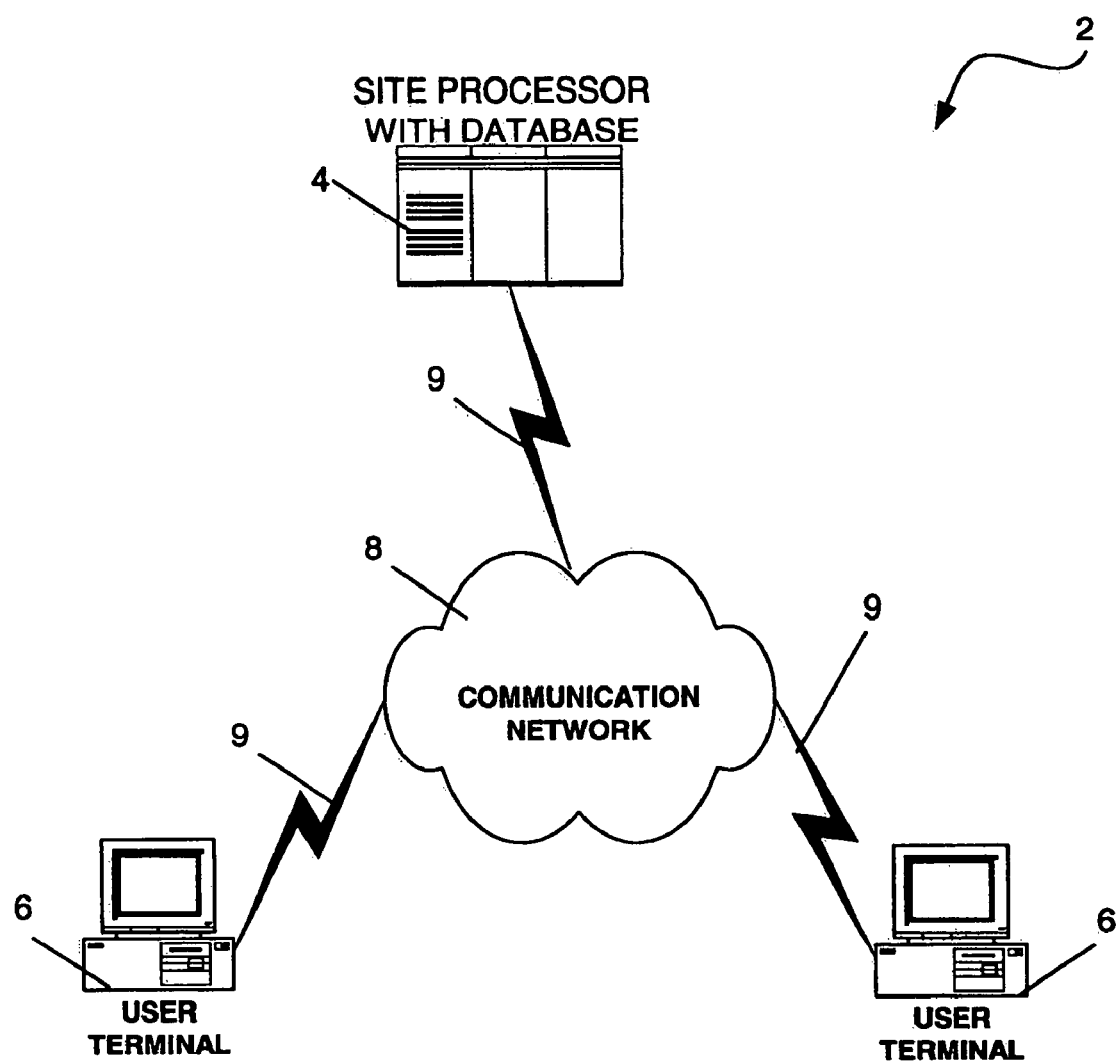
FIG. 1 is a diagram of an example hardware arrangement for a hybrid color shade library system constructed in accordance with the present invention.

As used herein, the term "web site" refers to a related set of files which are maintained in one or more "web servers" and which, when transmitted to a user terminal, cause the user terminal to display and/or execute programmatic operations corresponding to the data contained in the files. Typically, the files comprising the website are prepared using one or more of a combination of Hypertext Mark-Up Language (HTML), Extendable Mark-Up Language (XML), Java Applets, ActiveX programs, Standard Generalized Mark-Up Language (SGML) files and the like. Website files are typically transmitted to the user terminal using one or more protocol(s) such as the Hypertext Transfer Protocol (HTTP) under the Transmission Control Protocol/Internet Protocol (TCP/IP) suite of communication protocols.

Also as used herein, the term "browser" refers to an application program residing and executing on the user terminal which functions as an HTTP client, sending requests to web servers for web servers for website files. The request is typically sent in the form of a Uniform Resource Locator (URL) or by selecting a hypertext link presented on the user terminal display. The browser functions to receive a file and/or data from the web server and format the received files and/or data substantially in the manner described herein, displaying the same on the user terminal. Examples of browser programs include MICROSOFT INTERNET EXPLORER and NETSCAPE COMMUNICATOR.

Also as used herein, the term "visibly perceptible representation" refers to a perception of color as received by the human eye or other detecting device regardless of the medium for providing the representation, i.e., computer monitor, paper, printing press, etc.

As used herein, the term "link" refers to a selectable connection from one or more word(s), picture(s) or other information object(s) to others in which the selectable connection is presented within the web browser. The information object can include sound and/or motion video. Selection is typically made by "clicking" on the link using an input device such as a mouse, track ball and the like. Of course, skill in the art will appreciate that any method by which an object presented on the screen can be selected is sufficient.

In accordance with the present invention, colorant formulas are developed for at least two colored materials, one of which is may be an ink and the other of which may be a non-ink material, such as a structural or decorative plastic, an opaque paint coating or a fabric. The colors of these different materials match if a comparison of the visual appearance is acceptably similar. The level of acceptability is, typically, a commercial contractual agreement between the designer and the producer. In accordance with the present invention, a colored material producer will optimize (i.e., adjust the colorant type and amount) of the formulas until the color of the first material (e.g., the ink) and the color of the second material (e.g. plastic) reach the acceptable level and the required level of metamerism is achieved.

Referring now to the drawing figures in which like reference numerals refer to like elements, there is shown in FIG. 1 a diagram of an example hybrid color shade dissemination system constructed in accordance with the principles of the present invention and designated generally as "Hybrid Color Shade System 2". System 2 is preferably comprised of one or more site processor(s) 4 coupled to one or more user terminal(s) 6 across communication network 8. Site processor 4 preferably includes all databases necessary to support the present invention. However, it is contemplated that site processor 4 can access any required databases via communication network 8 or any other communication network to which site processor 4 may be coupled. If separate, site processor 4 can communicate with the database using any known communication method including a direct serial or parallel interface, or via a local or wide area network. User terminals 6 communicate with site processors 4 using data connections 9, which are respectively coupled to communication network 8. Communication network 8 can be any communication network, but is typically the Internet or some other global computer network. Data connections 9 can be any known arrangement for accessing communication network 8 such as dial-up serial line interface protocol/point-to-point protocol (SLIP/PPP), integrated services digital network (ISDN), dedicated leased-line service, broadband (cable) access, frame relay, digital subscriber line (DSL), asynchronous transfer mode (ATM) or other access techniques. User terminals 6 have the ability to send and receive data across communication network 8, and are equipped with web browsers to display the received data on display devices incorporated therewith.

By way of example, user terminals 6 may be personal computers such as Intel Pentium-class computers or Apple Macintosh computers, but are not limited to such computers. Other terminals which can communicate over a global computer network such as palmtop computers, personal digital assistants (PDAs) and mass-marketed Internet access devices such as WebTV can be used. User terminals 6, further, take into account associated hardware, for example printers, monitors, scanners and the like.

Also as used herein and for purposes of convenience, the term "workstation" refers to a user terminal 6, and, as appropriate in context, further refers to a person operating user terminal 6. Also as used herein, the terms "work-station characteristics" and "user terminal characteristics" refer to the functional elements of each workstation, but not limited to, central processing units, ROM, RAM, display devices, printing devices, network interfaces, disk drives, floppy disk drives, tape drives, CD-ROM DVD drives, databases and application code and one or more input device(s), for example keyboard, mouse, track ball and the like.

Also as used herein, a conditional match is referred to, generally, as a case in which "an invariant match cannot be made [requiring] the colorist to be content with making a close match under a limited sets of illuminating and viewing conditions" (see Principles of Color Technology, Fred W. Billmeyer, Jr. and Max Saltzman, Second Edition, pp. 144-145, John Wiley & Sons, 1981). As noted in the above publication, "[w]henever it is agreed that a conditional match must be made, it is important to know under what conditions (e.g., preferred light source or sources) the match is to be judged, since the match is of necessity metameric and will vary within the nature of the source and the observer." Id.

In addition, the hardware arrangement of the present invention is not limited to devices that are physically wired to communication network 8. It is contemplated that wireless devices using a wireless application protocol (WAP) or can inter-operate with site processors 4 using wireless data communication connections.

According to the present invention, user terminal 6 provides user access to site processors 4 for the purpose of receiving and providing color-related product data. The specific functionality provided by System 2, and in particular site processors 4, is described in detail below.

System 2 employs software that provides color-related functionality. For example, a plurality of information types are stored and are retrievable in software that preferably resides on one or more site processors 4. Examples of information types include electronic color information, color ink formulas, and resistance.

One of the functions capable of being performed by site processor 4 is that of operating as a web server and a web site host. Site processors 4 typically communicate with communication network 8 across a permanent i.e., unswitched, data connection. Permanent connectivity ensures that access to site processors 4 is always available.

Figure 2:
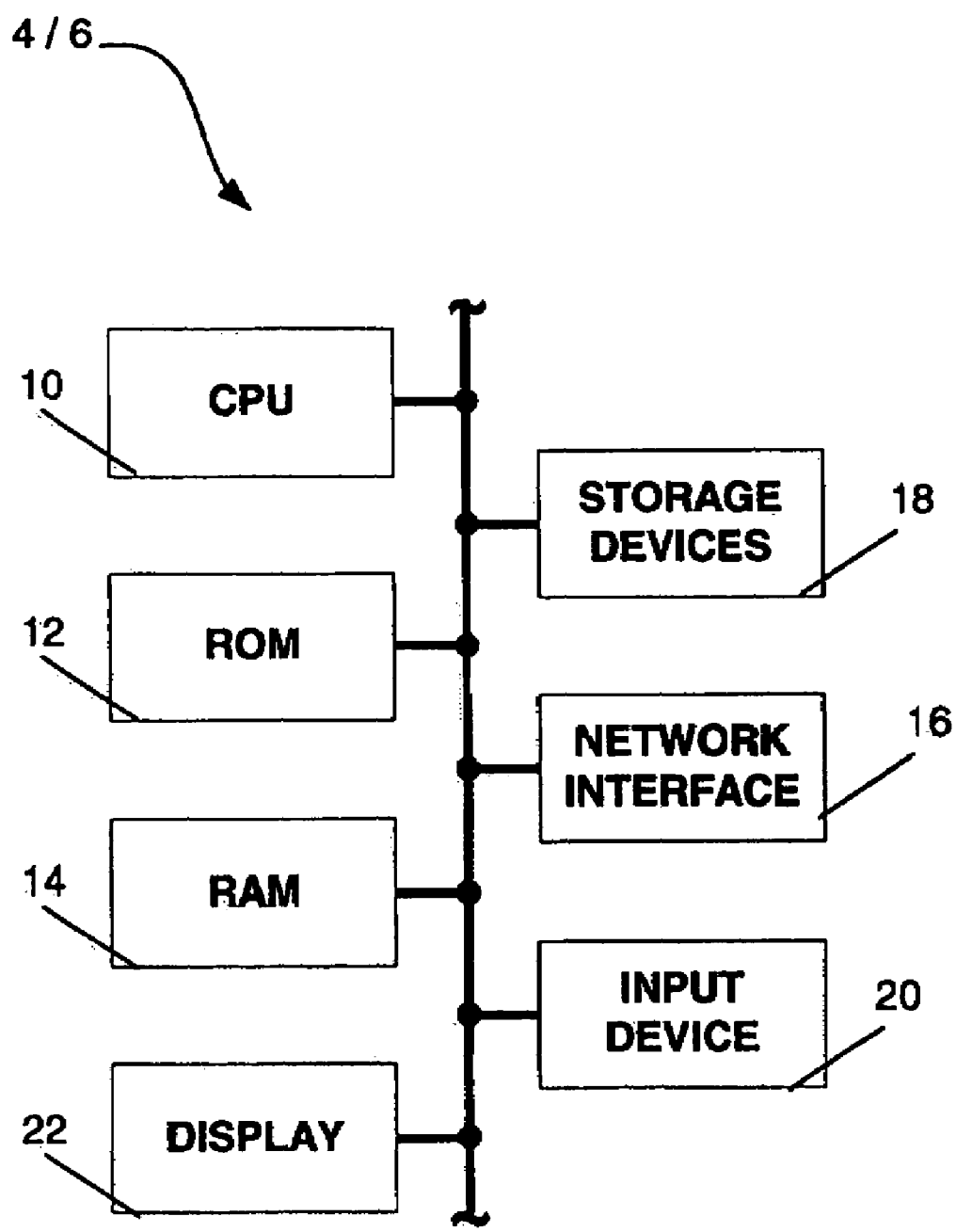
FIG. 2 is a block diagram of the functional elements of site processors and user terminals.

As shown in FIG. 2 the functional elements of each site processor 4 preferably include one or more central processing unit(s) (CPU) 10 used to execute software code in order to control the operation of site processor 4, read only memory (ROM) 12, random access memory (RAM) 14, one or more network interface(s) 16 to transmit and receive data to and from other computing devices across a communication network, storage devices 18 such as a hard disk drive, floppy disk drive, tape drive, CD-ROM or DVD drive for storing program code, databases and application code, one or more input device(s) 20 such as a keyboard, mouse, track ball and the like, and a display 22.

The various components of site processor 4 need not be physically contained within the same chassis or even located in a single location. For example, as explained above with respect to databases which can reside on storage device 18, storage device 18 may be located at a site which is remote from the remaining elements of site processors 4, and may even be connected to CPU 10 across communication network 8 via network interface 18.

The functional elements shown in FIG. 2 (designated by reference numbers 10-22) are preferably the same categories of functional elements preferably present in site processor 4. However, not all elements need be present, for example, storage devices in the case of PDAs. Further, the capacities of the various elements are arranged to accommodate the expected user demand. For example, CPU 10 in user terminal 6 may be of a smaller capacity than CPU 10 as present in site processor 4. Similarly, it is likely that site processor 4 will include storage devices 18 of a much higher capacity than storage devices 18 present in user terminal 6. Of course, one of ordinary skill in the art will understand that the capacities of the functional elements can be adjusted as needed.

The nature of the present invention is such that one skilled in the art of writing computer executed code (software) can implement the described functions using one or more of a combination of a popular computer programming language including but not limited to. C++, Visual Basic, Java, ActiveX, XML, HTML, and other web application development environments, for example ALLAIRE'S COLD FUSION® and MICROSOFT'S FRONT PAGE®.

As used herein, references to displaying data on user terminal 6 relate to the process of communicating data to the user terminal across communication network 8 and processing the data such that the data can be viewed on the terminal's display 22 using a web browser or the like. The display screens on terminals 6 present areas within System 2 such that a user can proceed from area to area within System 2 by select a desired link. Therefore, each user's experience with System 2 will be based on the order with which they progress through the display screens. In other words, because the system is not completely hierarchical in its arrangement of display screens, users can proceed from area to area without the need to "backtrack" through a series of display screens. For that reason, unless stated otherwise, the following discussion is not intended to represent any sequential operation steps, but rather the discussion of the components of System 2.

Although the present invention is described by way of example herein in terms of a web-based system using web browsers and a website server (site processor 4), System 2 is not limited to that particular configuration. It is contemplated that System 2 can be arranged such that user terminal 6 can communicate with, and further send, receive and display data to and from site processor 4 using any known communication and display method, for example, using a non-Internet viewer coupled with a local area network protocol such as the Internetwork Packet Exchange (IPX). Any suitable operating system can be used on user terminal 6, for example, WINDOWS 3.x, WINDOWS 95, WINDOWS 98, WINDOWS CE, WINDOWS NT, WINDOWS XP, LINUX, Apple OS/9 or OS/X and any suitable PDA or PALM computer operating system.

In a preferred embodiment, System 2 provides a comprehensive, yet easy to use, website that enables users to transmit or receive data relating to development of two or more colored materials of the same color. As used herein, a material refers generally to anything that can support color, including, but not limited to: ink, coatings, engineering materials and textiles. More particularly, System 2 enables users to select a choice of color, and to select two or more material criteria suitable for creating colored materials having the selected color and for each selected criteria. For example, one criteria is selected to represent a paper substrate, and another criteria is selected for an aluminum substrate. System 2 determines appropriate formulas to produce the selected color on the paper and on the aluminum. After System 2 determines the respective formulas, it optimizes the formulas in order to control metamerism. Such optimization may include, for example, adjusting the RGB values of the respective color formulas.

Color product specialists, including customers, designers, separators, printers, converters and the like preferably interact with each other, and with System 2 itself, via one or more hardware and/or software user interface(s). The user interfaces comprise display screen controls such as text input areas, drop down lists, buttons and screen menus providing users with tools for adding, viewing, and editing data.

In one embodiment, user terminal 6 receives data from a color measuring device, for example, a spectrocolorimeter. A data stream is transmitted from the device which may be initially formatted in a variety of device-related ("native") configurations. For example, sequences of data values originating from some measuring devices correspond to an interval in which spectral reflectance curves are read. One particular color measuring device may have a spectral reflectance curve data reading interval of 20 nm which produces a data sequence comprising patterns of 16 numbers. A different color measuring device may have an interval of 10 nm resulting in data formatted in of 31 numbers. The data are preferably received, formatted to a common standard, and processed notwithstanding their device-dependent qualities.

Continuing with the above example, user terminal 6 validates the received data, translates the data into distinct representations, performs data calculations (e.g., averaging and interpolating color data), and further transmits data to other hardware and software applications in a plurality of formats. Data are preferably transmitted directly to the receiving devices. Alternatively, the formatted data are transmitted to site processor 4 and thereafter forwarded to the respective receiving hardware and software applications.

In another embodiment, user terminal 6 interfaces with a color measuring device and receives spectral data, but does not perform any data processing functions. User terminal 6 transmits the spectral data to site processor 4 at substantially the same time when the data are being received from the measuring device. Programmed data formatting routines operate within site processor 4 and the data are further transmitted to hardware and software applications.

In yet another embodiment, a color measuring device is not used during development of a colored material. Instead, a color sample is created or retrieved on a user terminal 6 with software provided by system. For example, a designer operating user terminal 6 creates a sample of color. The sample is transmitted to System 2 and development of the color product continues. In this embodiment, no color measuring device, other than the user terminal 6, is utilized by the respective parties.

Formulas for producing colored material suitable for a plurality of materials criteria may be determined by manual mixing of colorants selected by a master shader followed by visual or instrumental confirmation of the color. The formula for an ink or other material may also be determined using a computer assisted color matching ("CCM") software application, also known as a computer color formulation program or a computer recipe prediction program. The ink and other material formulas are derived either by initial trial of possible combinations of colorants, for example, taken 1, 2 and 3 at a time (combinatorial algorithm), or by retrieving a close but not acceptable color from a palette library and then modifying the formula in order to provide an acceptable color. Preferably, regardless how any ink and other material formulas are determined, the formula is stored in a database for use, substantially as described herein.

Figure 3:
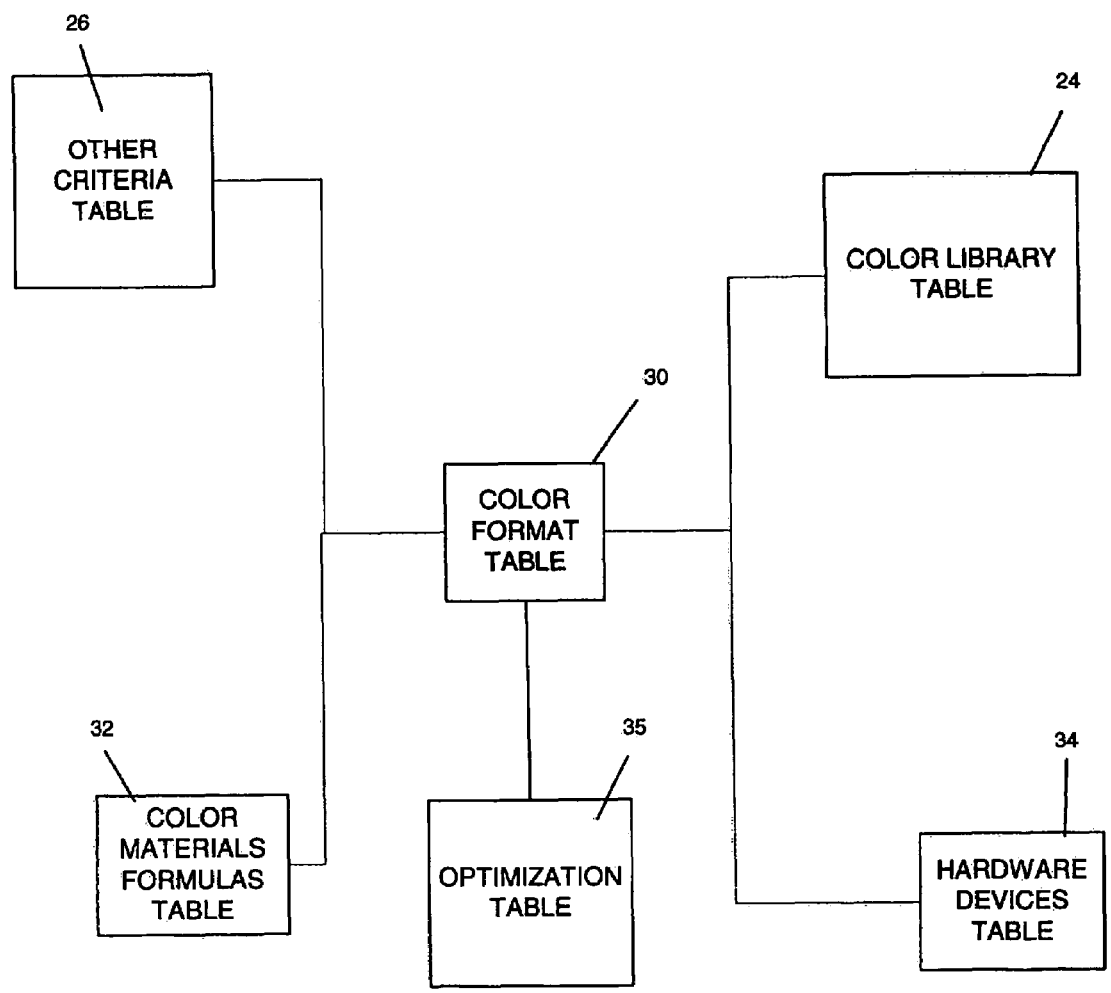
FIG. 3 illustrates the relationships between database tables used in an embodiment of the present invention.

FIG. 3 illustrates the interaction of database tables in a preferred embodiment of the present invention. The tables are used by System 2 to store and manipulate data regarding development of color materials, including colored ink. Users of System 2 are preferably given access to the database tables and to the data therein. In a preferred embodiment, users are supplied with a pointer to the specific database table and/or data rather than receiving the complete database tables or data at the user terminal 6.

As shown in FIG. 3, color library table 24 preferably contains records regarding colors. For example, spectral data regarding a specific color are stored in color library table 24. Other types of information stored in color library table are color material formulas that can recreate colors or various materials. In addition to spectral data and color material formulas, a plurality of names of colors are associated with the spectral data and color material formulas in color library table 24. Furthermore, other criteria table 26 includes data regarding elements that can impact a color.

Other criteria table 26 contains, for example, data regarding a color's ability to resist various elements, such as water, solvent, acid, alkali, temperature, humidity, abrasion, crocking, bending, light and ultraviolet radiation. Additional examples of information stored in other criteria table 26 include freeze-thaw cycles and lamination bond strength. Moreover, these criteria may be in the form of an ISO standard performance indices, such as ISO 105/A05 Gray Scale index of color change. There are ISO indices of staining, solvent resistance and the like, all with numeric scales.

Color format table 30 preferably contains data regarding the color representations (e.g. RGB, CMYK and CIE XYZ) used by the various devices with System 2. Color materials formulas table 32 contains data regarding a plurality of providing colored materials for producing colored products, including providing inks for various printing methods, for example offset printing and gravure printing. Different printing methods may impact the formulas for creating color ink suitable for creating a particular color. Hardware devices table 34 contains data regarding a plurality of hardware devices involved in color product development, for example monitors, printers and scanners. Optimization table 35 contains data directed to colored materials formulas that are optimized in order to control metamerism. For example, a formula for producing a particular shade of blue and stored in color materials formulas table 32 may require optimization in order to reduce or eliminate effects caused by metamerism. Continuing with this example, the formula is optimized by reducing the value of the green channel (of RGB channels for the respective color). By decreasing the amount of green in the RGB values, the color will be slightly modified, as will be the formula for creating the materials to produce the color in order to reduce or eliminate the undesired effects caused by metamerism. Accordingly, the formula is optimized, and the optimized formula is preferably stored in optimization table 35.

In a preferred embodiment, each of the records in database tables 26-35 are related to a color record in color library table 24. For example, a plurality of records exists in color library table 24 corresponding to a particular shade of blue. The other criteria table 26 includes records corresponding to a plurality of substrates or materials. The color materials formulas table 32 preferably contains color material formulas that to the particular shade of blue and the plurality of materials contained in other criteria 26. The other criteria table 26 also contains records that relate to the ability of that blue color to resist a plurality of elements, such as water, solvent, acid, alkali, temperature, humidity, abrasion, crocking, bending, light and ultraviolet radiation. By relating records in a plurality of tables to one or more records in the color library table 24, System 2 provides a robust system and method for providing selections directed to color product design and development.

Further, System 2 provides a plurality of selectable choices for users to retrieve a plurality of color ink and material formulas to transmit to one or more color ink specialists, for example, ink manufacturers and to one or more materials compounds.

Figure 4:
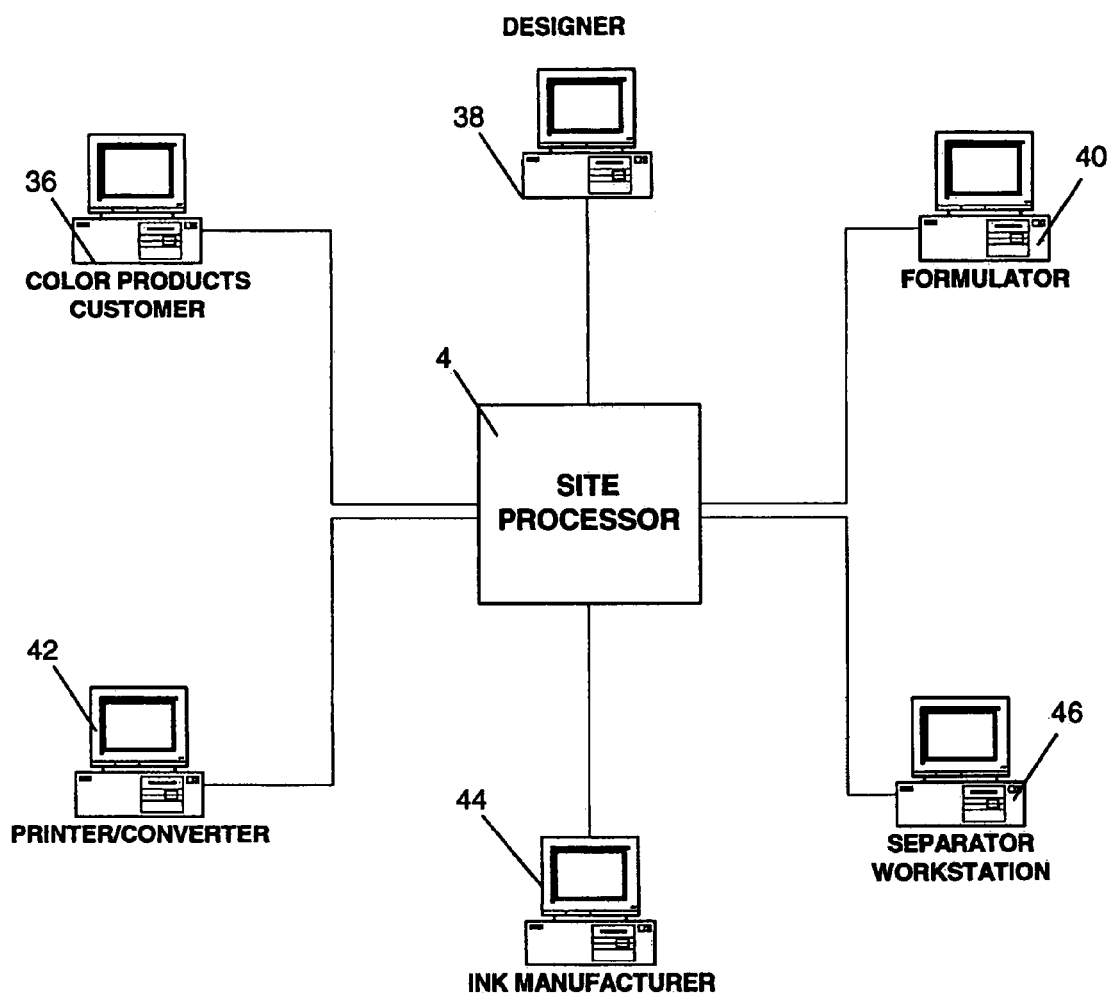
FIG. 4 depicts the relationships between the pertinent parties.

A detailed description of the parties to System 2 and their respective functions is now discussed with reference to FIG. 4. In accordance with the principles of the present invention, System 2 preferably receives color product data from a plurality of sources, including color measuring devices and user terminals 6. As noted above, System 2 preferably stores a plurality of color materials formulas tin a database and provides a color material formula to create a colored material. Furthermore, System 2 provides a way to select among colors, substrates and other criteria to retrieve a plurality of color ink formulas for transmission to color product development specialists.

The demand for color materials and services originates from many types of businesses and non-business parties that have needs for color production. For example, consumer product manufacturing, advertising, promotional material, and interior and exterior design companies require color-related services. Color products customers 36 specify color requirements for packaging products, for example food packaging. Color products customers 36 further provide details including package design parameters, colors, substrates and print processes to one or more parties. System 2 allows the associated color product development specialists to communicate substantially simultaneously. Many communications between the contributing parties to the development of a color product occur. For example, printers/converters 42 contract with ink manufacturers 44 for production of ink. Formulators 40 calculate appropriate color formulas that define appropriate color weights and combinations of pigment for creation of a specific color, for example by referencing data in color library table 24. Ink manufacturers 44 further communicate with raw material suppliers, dyers, separators, plate makers, cylindrical engravers and the like, for materials according to specific parameters. As noted above, the prior art method of communicating this information is costly and time consuming.

Other embodiments of the present invention are available with regard to the way a user interfaces with System 2. For example, once designer 38 selects a desired color (e.g., navy blue), System 2 presents available substrates that can support the color. Moreover, after the designer 38 selects a substrate, System 2 presents available printing techniques that can produce the desired color product. In an alternative embodiment, System 2 provides many choices to the designer 38 at the outset of the color product design, and the designer 38 makes selections (e.g. navy blue on a particular substrate). Other material supply specifications include details such as color, rheological properties, product resistance, and residual chemical requirements. For example, completed ink samples are transmitted to a printer/converter 42 and are further delivered to several parties, including color products customer 36, designer 38 and/or formulator 40 for approval.

An example of providing a plurality of color materials formulas to produce a color for a plurality of color materials is now described with reference to the flowchart shown in FIG. 5. This example represents one possible sequence of events. Of course, one skilled in the art will recognize that many possible steps and combinations of procedural steps are possible in order to provide a plurality of color formulas to produce a color for a plurality of color products.

Figure 5:
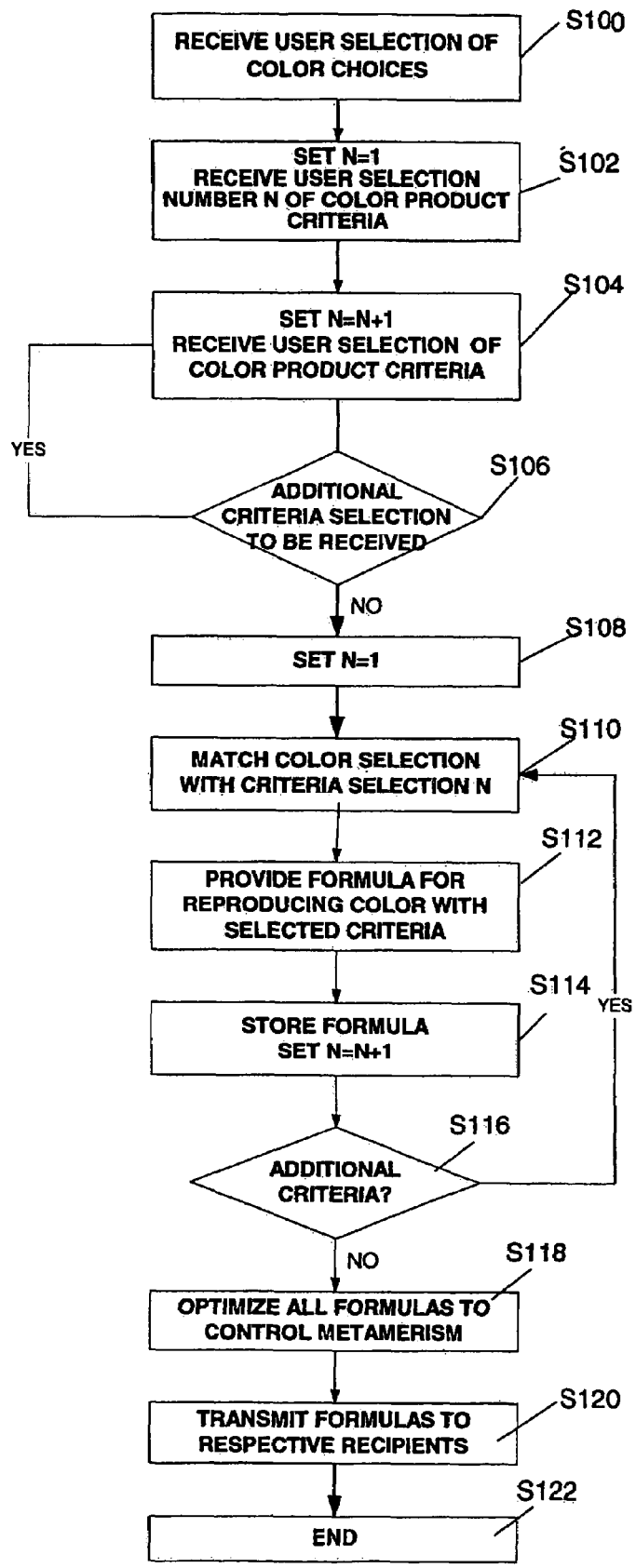
FIG. 5 shows a flow chart identifying a control of the processes involved in providing formulas to produce a single color on a plurality of color products.

As shown in FIG. 5, a color selection is received from a user operating an embodiment of the present invention (step S100). Preferably, a color selection may be received by a user selecting a value in a graphic control, such as a drop-down list, in a display screen. Of course, one skilled in the art will recognize that many methods for providing data, with or without graphic controls such as buttons, lists, text boxes and the like, in a display screen are available. In step S102, a variable, N, is set to equal the value 1. The value of N is used to represent the respective criteria selections made by a user of the present invention. Additionally, a first criteria selection (criteria selection N) is received from the user. The user may, as in step S100, select from a plurality of choices in a graphic control, such as a drop-down list. Thereafter, another criteria selection (criteria selection N+1) is received from the user (step S104). For example, the color selected is teal, the first criteria represents a paper substrate and the second criteria selection represents an aluminum substrate. Thereafter, in step S106, a determination is made whether an additional criteria is to be received from the user. If so, then the process loops back to step S104, N is incremented by 1, an additional criteria selection (N) is received by the user. In the event that no additional criteria are to be received, then the process continues to step S108. After all the criteria selections have been made by the user and received by System 2, then the value, N, is reset to 1 (step S108). In step S110, a correlation process occurs, and System 2 matches the color selection received in step S100 with the first criteria received (since N=1). After correlating the selected color with the Nth criteria, System 2, in step S112, produces a formula (e.g. ink or colorant) for reproducing the selected color and the Nth selected criteria.

The formula is stored in a table (for example, optimization table 35) and the value of N is incremented by 1 (step S114). After the formula is produced and stored in a database, a determination is made in step S116 whether additional criteria have been selected. Since only one formula has been created up to this point in the process, System 2 will determine that an additional criteria selection was made in step S104. Therefore, after storing the first formula in a database table and incrementing the value of N, the process loops to step S110 and the color selection made in step S100 is matched with the criteria selection N. When the process returns to step S116, System 2 again makes the determination whether additional criteria were received. If so, the process continues to step S110. If not, the process continues to step S118. After all of the criteria selections have been correlated to the selected color, and color formulas have been provided and stored, the process continues to step S118 and the formulas are optimized in order to control undesirable effects, for example, caused by metamerism.

Figure 6:
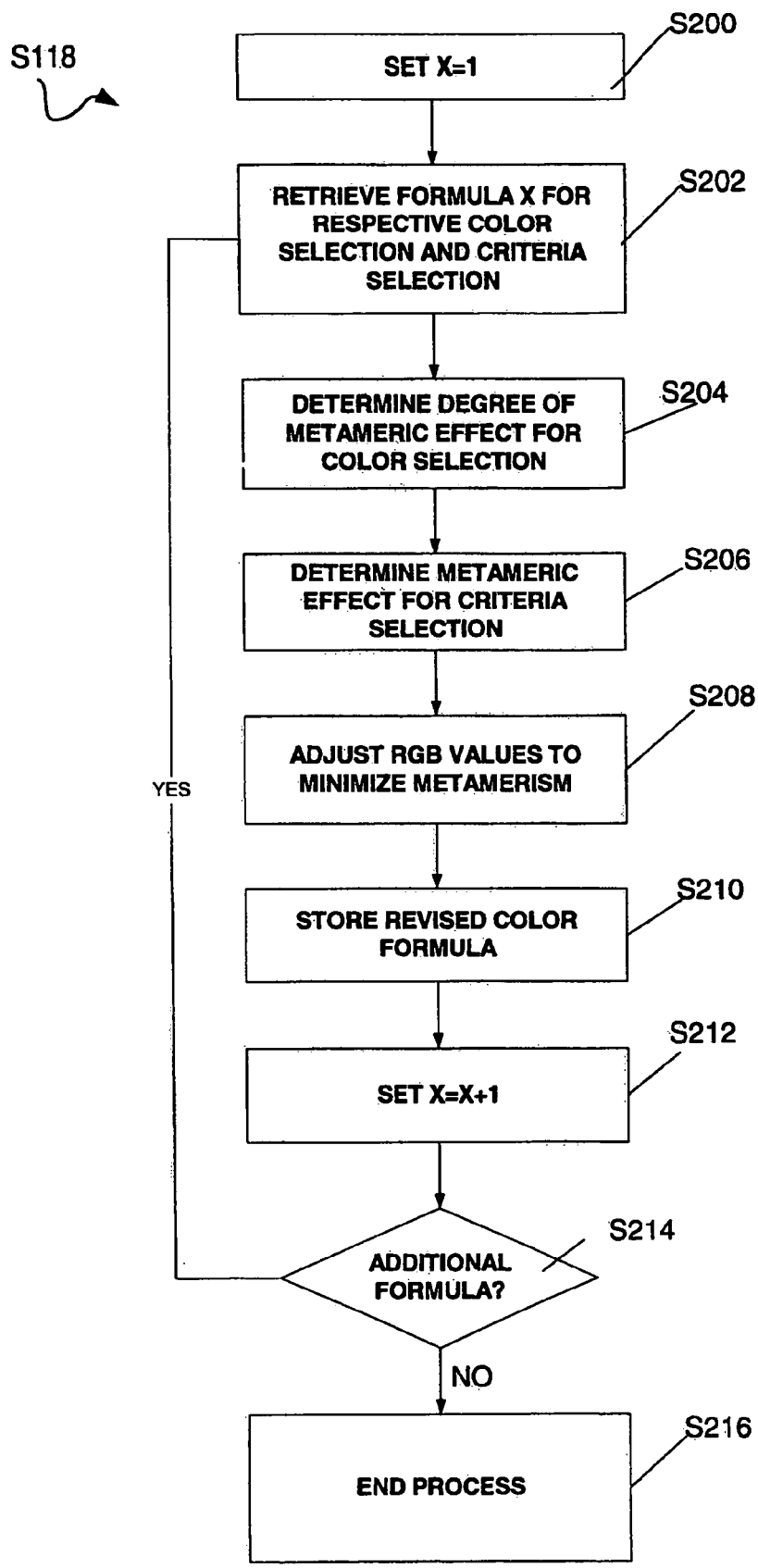
FIG. 6 depicts a flow chart steps associated with optimizing a plurality of color ink formulas to control metamerism.

The steps involved in the optimization process are further described with reference to a corresponding flow chart, shown in FIG. 6. After the formulas are optimized in step S118, then the process continues to step S120, and the optimized formulas are transmitted to respective recipients. For example, an ink manufacturer 44 who is producing an aluminum color product substrate receives the optimized formula for producing the selected color, teal, on aluminum. The same or different ink manufacturer 44 who is producing a colored paper product receives the optimized formula for producing teal on paper. Preferably, the optimized formulas are transmitted electronically, for example by e-mail, file transfer protocol ("FTP"), or facsimile. Any known method of transmitting the optimized formulas are envisioned herein. After the optimized formulas are transmitted to the respective recipients, then, in step S122, the process ends.

The example flow chart in FIG. 5 illustrates one way that System 2 can receive a single color selection and a plurality of criteria selections in order to provide optimized formulas for producing the color for the respective criteria selections. Procedural steps associated with optimizing the color formulas, and an example display screen of a graphic user interface ("GUI") for providing user selections is shown in FIG. 6. FIG. 6 shows an example flow chart of steps associated with optimizing color formulas of step S118 (FIG. 5). As shown in the steps illustrated in FIG. 6, in step S200, a variable, X, is set to the value 1. The variable X is used to represent the various formulas provided in accordance with steps S100-S118 (FIG. 5). After the variable X is set to 1, the process continues and formula X that represents a colorant formula for the selected color and a respective criteria is retrieved, for example from color materials formulas table 32 (step S202). In step S204, a determination is made of the degree of metameric effect on the color selection. As noted above, specific colors, such as grays, tans and blues are subject to more or less effects caused by metamerism. Next, a determination is made of the degree of metameric effect on the criteria selection (step S206). After the determination is made, the formula is optimized to reduce or eliminate the metameric effect on the color and criteria (step S208). The optimized formula is, thereafter, stored in a database table, for example, optimization table 35 (step S210). In step S212, the value of X is incremented by 1, and in step S214, a determination is made whether another formula is provided for optimization. If another formula is available, then the process loops to step S202. If no other formula is available, then the process terminates at step S216. Thus, using the steps described above with respect to FIG. 6, a plurality of formulas are optimized (step S118, FIG. 5) in order to provide a single color on a plurality of color products in which the effects caused by metamerism are reduced or eliminated.

Figure 7:
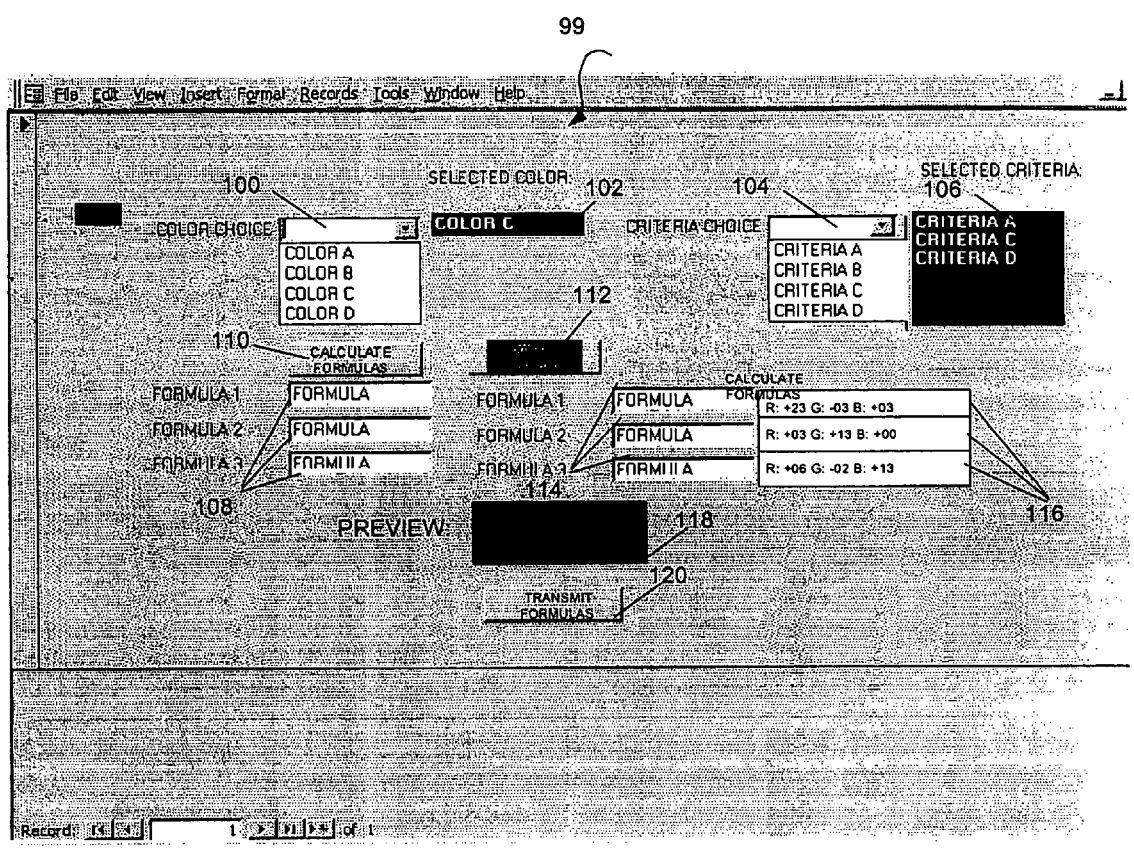
FIG. 7 is a sample display screen received by a user of the present invention.

FIG. 7 shows an example display screen 99 that illustrates a GUI for enabling users of System 2 to make color and criteria selections in order to avail themselves of the benefit of the present invention. Of course, one skilled in the art will recognize that the example shown in FIG. 7 is only one of many possible ways that information directed providing data can be presented. In the example display screen shown in FIG. 7, a user makes a color selection from color drop-down list 100. The color selection that is made by the user is presented in selected color text box 102. A user is afforded, via criteria drop-down list 104, the opportunity to enter a plurality of criteria for color products to which the selected color will be applied. The selected criteria choices are provided in criteria text box 106. After the user has selected a color and a plurality of criteria, then the formulas for producing the color with the respective criteria are shown in formula text box 108. The number of text boxes 108 that are presented to the user depends upon the number of criteria that are selected via criteria drop-down list 104. Preferably, the formulas are calculated after a graphic control, such as calculate formulas button 110, is selected. The formulas presented in formula text boxes 108 are not optimized, and do not provide for reducing or eliminating undesirable effects caused by metamerism. Accordingly, optimize formulas button 112 is available to enable a user to invoke step S118 (FIG. 5 and FIG. 6) and provide optimized formulas. The optimized formulas are preferably provided to the user, for example in optimized formula text boxes 114. Moreover, the adjustments made to the formulas are provided in text boxes 116. In the example shown in FIG. 7, the adjustments are made to the RGB color values that are used to represent the color. After the formulas are optimized, the user is presented with a preview of the color in preview box 118. The optimization routines performed on the color formulas may impact the way the color appears. Therefore, the user can preview the color in order to be sure the color complies with the user's specification. Moreover, the user is afforded countless opportunities to modify the selections made in display screen 99 in order to ensure the color is correct. For example different color and criteria can be selected, and the formulas can be calculated and optimized accordingly. Once the user is satisfied with the results, transmit button 120 is selected and the formulas are transmitted to appropriate receiving parties. Thus, the present invention advantageously provides a comprehensive network-based facility that allows a variety of participants in the color product production chain to communicate color and color ink formula information with each other, for example, by using a simple web browser interface. A plurality of users receive the same communications firsthand and substantially instantaneously. Additionally, a virtually unlimited number of users can log in and enter, monitor or resolve the types of color-related issues discussed herein limited only by the capacities of communication network 8 and site processor 4. Users of the system can enter their own requests independently and data communications are triggered automatically without the need for system-provider personnel intervention. The invention therefore allows manufacturers, designers and printers to operate at peak efficiency, producing a high commercial gain, high customer satisfaction and a successful return on investment.

Although the present invention has been described in relation to particular embodiments thereof, many other variations and modifications and other uses will become apparent to those skilled in the art. It is preferred, therefore, that the present invention be limited not by the specific disclosure herein.

The invention claimed is:

1. A method for controlling metamerism by providing a plurality of formulas that are suitable for producing a color for at least two different types of colored materials, the method comprising:
   electronically providing color choices, the color choices selectable to represent the color;
   electronically providing criteria choices, the criteria choices selectable to represent at least a characteristic of the at least two different types of colored materials;
   electronically receiving a color selection from the color choices;

electronically receiving a first criteria selection from the criteria choices;

electronically receiving a second criteria selection from the criteria choices;

electronically matching the color selection and the first criteria selection and providing a first formula suitable to produce the color represented by the color selection for a first of the at least two different types of colored materials;

electronically matching the color selection and the second criteria selection and providing a second formula suitable to produce the color for a second of the at least two different types of colored materials; and electronically optimizing the first formula and the second formula to control metamerism between the first colored material and the second colored material.

2. The method of claim 1, further comprising electronically receiving a third criteria selection from the criteria choices and combining at least one of the first criteria selection and the second criteria selection with the third criteria selection.

3. The method of claim 1, wherein the color choices and the criteria choices are presented in a display.

4. The method of claim 1, wherein the criteria includes at least one of a substrate, financial cost, availability, resin, polymer, varnish, printing method, fabrication method and pigment selection.

5. The method of claim 1, wherein the criteria includes the ability for a color to resist at least one of sunlight, water, solvent, acid, alkali, temperature, humidity, abrasion, cracking, bending, light and ultraviolet radiation.

6. The method of claim 1, wherein the steps of providing, receiving, matching and optimizing occur over a communication network.

7. The method of claim 6, wherein the communication network is the Internet.

8. The method of claim 1, wherein the step of optimizing includes modifying the color represented by the color choices.

9. The method of claim 1, further comprising storing the color choices and the criteria choices in an electronic library.

10. A system for controlling metamerism by electronically providing a plurality of formulas that are suitable to produce a color for at least two different types of colored materials, the system comprising:

a memory that electronically stores a color choice, the color choice is selectable to represent the color;

a color selection module that includes a color selection interface to enable an electronic color selection from a plurality of color choices, wherein the color choices and color selection are stored in the memory;

a criteria selection module that includes a criteria selection interface to enable an electronic selection of a first criteria selection and a second criteria selection from a plurality of criteria choices, the first and second criteria selections and criteria choices stored in memory;

a matching module that electronically matches the color selection and the first criteria selection, and electronically matches the color selection and the second criteria selection;

a formula module that provides a first formula suitable to produce the color for a first of the at least two colored materials, and provides a second formula suitable to produce the color for a second of the at least two different types of colored materials; and an optimization module, the optimization module electronically optimizes the first formula and the second formula to control metamerism between the first colored material and the second colored material.

11. The method of claim 10, wherein the criteria selection interface enables at least a third electronic criteria selection.

12. The method of claim 11, further comprising a combining module that combines at least one of the first criteria selection and the second criteria selection with the third criteria selection.

13. The method of claim 10, further comprising a display that presents the color choices and the criteria choices.

14. The method of claim 10, wherein the criteria includes at least one of a substrate, financial cost, availability and pigment selection.

15. The method of claim 10, wherein the criteria includes the ability for a color to resist at least one of sunlight, water, solvent, acid, alkali, temperature, humidity, abrasion, cracking, bending, light and ultraviolet radiation.

16. The method of claim 10, further comprising a communication network.

17. The method of claim 16, wherein the communication network is the Internet.

18. The method of claim 10, wherein the of optimizing module modifies the color represented by the color choice.

19. The method of claim 10, further comprising an electronic library wherein the color choices and the criteria choices are stored.

20. The method of claim 19, further comprising a user interface that provides means to add, update and delete information stored in the electronic library.

* * * * *